March 3, 1936.  B. HOWELL ET AL  2,032,986
IGNITION DEVICE FOR INTERNAL COMBUSTION ENGINES
Filed Jan. 17, 1933  2 Sheets-Sheet 1
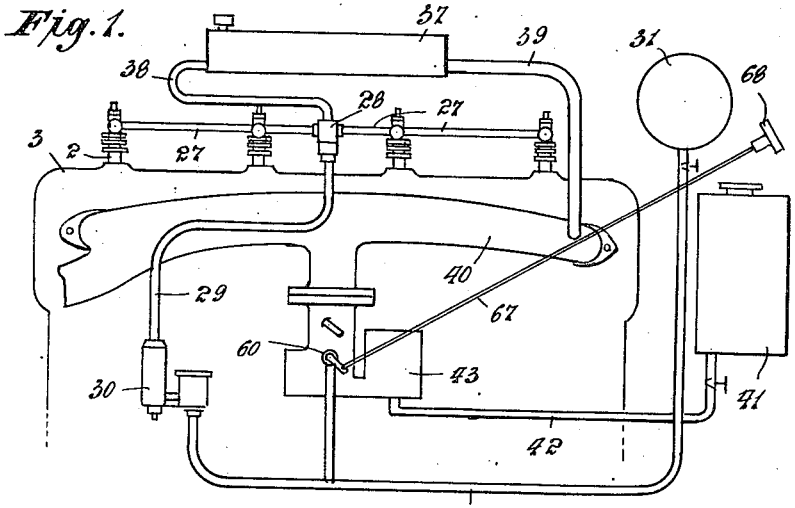
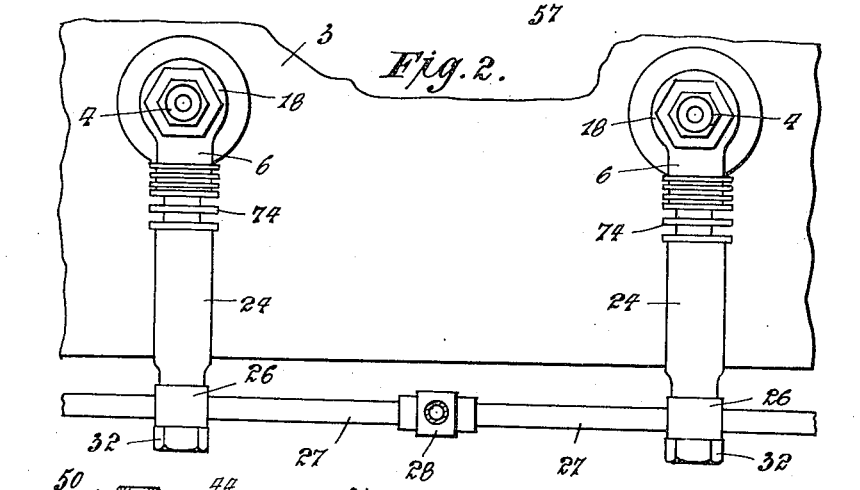
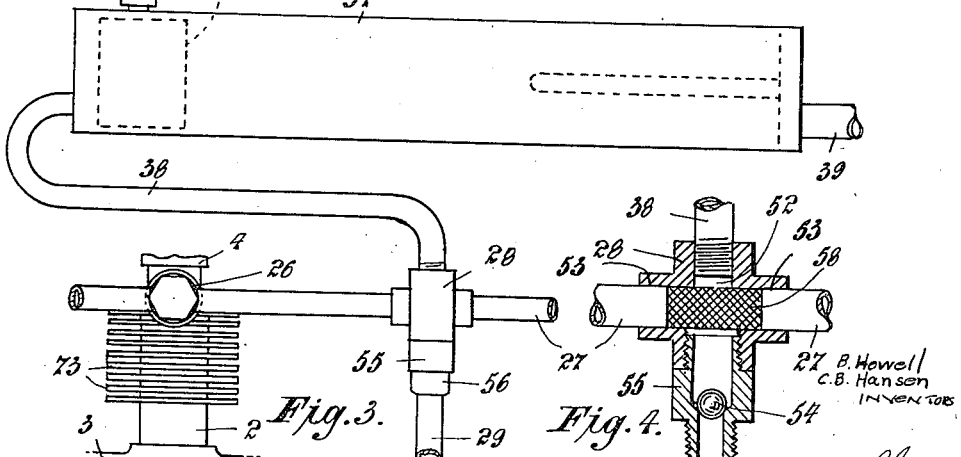

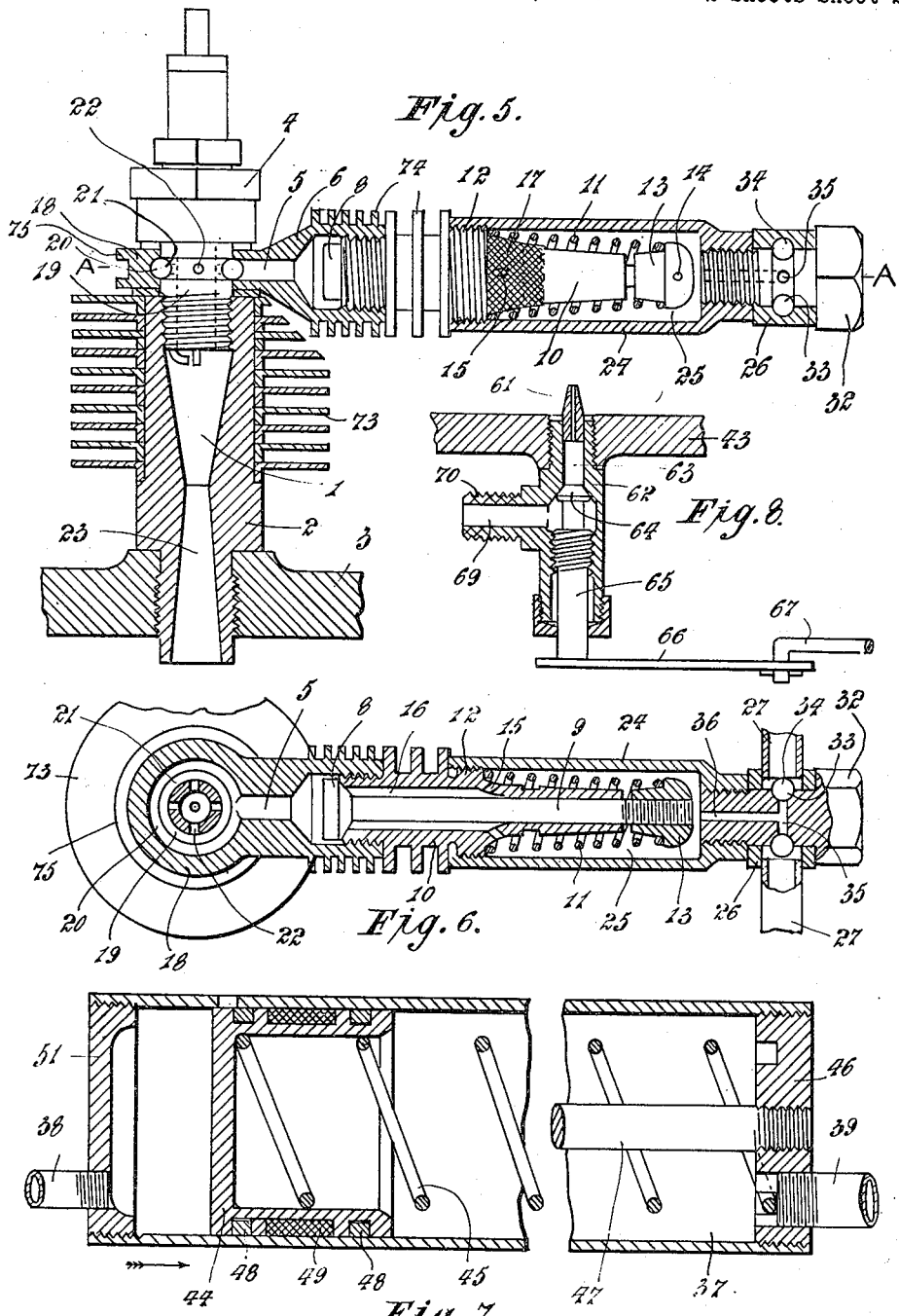

Patented Mar. 3, 1936

2,032,986

UNITED STATES PATENT OFFICE 2,032,986

IGNITION DEVICE FOR INTERNAL COMBUSTION ENGINES

Ben Howell and Charles Bjerre Hansen, Napier, New Zealand

Application January 17, 1933, Serial No. 652,204
In New Zealand July 28, 1932

12 Claims. (Cl. 123—143)

This invention relates to ignition devices for internal combustion engines, and particularly to devices by which the charge in the combustion chamber is ignited by means of a flame projected into the engine combustion chamber from a separate ignition charge fired from an ignition plug.

The objects of the present invention are to shield the spark plug from the intense heat from the combustion chamber; to prevent the lubricating oil within the cylinder coming into contact with the plug; to provide a sharper or more certain ignition of the charge in the combustion chamber; to ensure the reliable functioning of the ignition; and also, by attaining these objects, enabling the less refined and cheaper fuels to be used.

According to the present invention, an ignition combustion chamber is fitted to the wall of the combustion chamber of the engine and has igniting means fitting therein. A valve chamber communicating with the ignition combustion chamber contains a non-return valve adapted to open under suction from the engine, and is connected to an ignition carburetor fed from a source of fuel supply, while a reserve supply of explosive mixture is enabled to be held in reserve and to be forced to the valve chamber and thence to the ignition combustion chamber upon any failure of the engine suction.

The invention will be fully described with the aid of the accompanying drawings, wherein:—

Figure 1 is a diagrammatic assembly view of the various portions of the apparatus.

Figure 2 is a fragmentary plan showing the application to two of the ignition units.

Figure 3 is an elevation showing an elevation of the reserve chamber and its connection with the ignition units.

Figure 4 is a sectional elevation of a junction and non-return valve, but this and the succeeding views are drawn to twice the scale of the two preceding views.

Figure 5 is a sectional elevation of an ignition unit fitted to the wall of an engine combustion chamber.

Figure 6 is a sectional plan taken along line A—A, Figure 5.

Figure 7 is a sectional elevation of a portion of the reserve chamber.

Figure 8 is a sectional elevation of a starting valve.

Referring to the drawings, a chamber 1 (see Figures 5 and 6) for the ignition charge is situated in a casing 2 screwed into the wall 3 of the engine combustion chamber, while a spark plug 4 is screwed into the top of the casing 2. A lateral passage 5 communicates with the chamber 1, this passage being located in the casing 6 of a valve chamber 7 containing a valve 8 adapted to open under suction of the engine. The valve 8 is guided by its stem 9 in a valve body 10, which is screwed into the end of the valve chamber casing 6, and held in a normally closed position on its seating under pressure of a spring 11, which is in compression between an enlarged portion 12 of the body and a nut 13 screwed upon the end of the stem and secured by a pin 14. The valve body 10 has orifices 15 for the passage of vapour into the interior portion 16 thereof, these orifices being covered by wire gauge 17 to prevent the admission of foreign matter and to act as a fireguard. The casing 6 of the valve chamber 1 is formed with a flattened circular shaped end 18 having a circular opening through which the lower end 19 of the spark plug 4 passes, while within this opening an annular recess 20 communicates with the passage 5. The lower end 19 of the spark plug has an external annular recess 21 concentric with the recess 20, while radial orifices 22 are provided in the portion 19 and lead from the annular space formed by the combined recesses 20 and 21. This arrangement enables the casing 6 to be placed in any radial position relative to the casing 2, and will provide a passage for the explosive mixture from the passage 5 to the orifices 22 and enables the mixture to pass into the chamber 1. The chamber 1 is tapered towards its lower end and has a lower portion 23 opening outwards as shown.

A cover 24 screws upon the enlarged portion 12 of the valve body, the interior forming a passage 25 to the orifices 15. To this cover is connected a socket 26 (see Figure 2 and Figure 6) carrying distributor pipes 27 to the several ignition units (see Figure 1), from two of which the distributor pipes lead to a distributing chamber, herein conveniently referred to as a junction 28 (see also Figures 3 and 4). From the junction 28 leads a pipe 29 to a carburettor 30, of any ordinary preferred type, connected by a pipe 57 to a fuel chamber 31 for containing a light or refined ignition fuel. Thus it will be seen that suction in the engine will draw fuel into the carburettor and explosive mixture therefrom into the passage 25. The distributor pipes 27 are enabled to be continued to any number of ignition units, by reason of the construction of the connection between the sockets 26 and the interior passage 25 of the cover 24. This consists of a stud 32 which passes through the socket and is screwed into the end of the cover 24, and has an annular passage 33 concentric with an annular passage 34 in the socket and also has a bye-pass 35 from which leads an orifice 36 into the interior of the cover (see Figures 5 and 6).

A reserve supply chamber 37 has a pipe 38 leading to the junction 28, and from the other end of this chamber a pipe 39 leads to the engine induction pipe 40. The ordinary fuel container 41 communicates by a pipe 42 to the engine carburettor 43 in the usual manner. The chamber 37 (see Figures 3 and 7) comprises a cylinder having a piston 44 fitted therein under the influence in one direction of a spring 45 in compression between the piston and an end wall 46, the spring tending normally to retain the piston at one end of the cylinder, as shown in dotted lines in Figure 3. The spring is held within the hollow piston and centred around a stop pin 47, the piston itself having rings 48 and an oil packing 49, above the normal position of which a closed oil cap 50 is fitted to the wall of the cylinder. This pipe 38 leads from the other end wall 51 of the cylinder, as shown, while the pipe 39 is fitted into the end wall 46. The pipe 38 leads to the junction 28, which, as shown in Figure 4, consists of a casing having a passage 52 into which the pipe 38 is led, and opposing passages 53, from which leads the distributor pipes 27 to the sockets 26 held in position upon the end of the valve covers. A non-return ball valve 54 is located in a casing 55 which is screwed into the passage 52, the pipe 29 being connected thereto by a usual form of coupling 56.

In operation, on the suction stroke of an engine piston, the suction is communicated from the engine combustion chamber to the ignition combustion chamber 1, thence to the passage 5, opening the valve 8 against the pressure of its spring 11, the suction being then communicated along the passage 25 to the orifice 36, bye-pass 35, pipe 27, to the junction 28, thence to the pipe 29 and ignition carburettor 30. The fuel from the tank 31 supplies the carburettor 30, and the suction acts on the carburettor in the usual manner, forming the explosive mixture which is drawn past the non-return valve 54, thence along the distributing pipes 27, through the bye-pass 35, orifices 15, and past the valve 8 into the passage 5, radial openings 22 in the spark plug, and thence into the upper and lower combustion chambers. On the compression stroke of the engine, this mixture is compressed around the spark plug by the charge in the engine combustion chamber being drawn from the carburettor 43 in the ordinary way. The ignition charge is now fired by the spark plug, this causing a jet of flame to be blown out into the main combustion chamber, thereby ensuring positive ignition by the jet of flame instead of by a small electric spark.

When the engine is stationary, the piston 44 of the reserve chamber is at its end of the cylinder, as shown in dotted lines in Figure 3, but when the engine is started or is running, the suction from the induction pipe will draw the piston 44 in the direction of the arrow in Figure 7, compressing the spring, and this forward movement of the piston will cause a suction along the pipe 29 to the junction 28, thereby drawing a portion of the explosive mixture (from the carburettor 30) into the space behind the piston 44. When the engine is steadily running, this mixture is simply in reserve, but upon the throttle being quickly opened, the suction momentarily fails in the induction pipe. The spring then pushes the piston back and forces the reserve mixture into the junction 28, but is prevented from passing into the pipe 29 by means of the ball valve 54 in the junction. It is, therefore, directed or forced into the ignition chamber 1 and is fired by the spark plug, thus obviating any failure of an ignition charge to the ignition chambers. The non-return valve also acts as a safety valve in case of any backfire reaching the distributor pipes 26, while wire gauze 58 in the passage 53 also aids in preventing any backfire reaching the carburettor 30.

In practice, the movement of the piston 44 will vary considerably, being sensitive to any variation of the suction in the induction pipe of the engine and will supply the extra amount of mixture on even a partial reduction of the suction.

In Figure 8 is illustrated a needle valve, which is screwed into the main carburettor just below the throttle valve, as indicated at 60 in Figure 1. This needle valve comprises a jet 61 fitted into the end of a casing 62, having a passage 63 controlled by a valve 64, the stem 65 of which is attached to an arm 66 connected to a rod 67 leading to an operating button or handle 68 (see Figure 1) convenient to the operator. A lateral passage 69 from the valve passage 63 is located in a branch 70, which is connected to the pipe 57, as shown in Figure 1. This valve is for the purpose of enabling a little light fuel to be fed into the engine carburettor 43 when the engine is being started. The explosive mixture therefrom will be compressed into the chambers 1 and 23 and fired by the spark plug. As soon as the engine and ignition combustion chambers are hot, this valve can be shut off by means of the button or handle 68.

Removable fins 73 are provided around the casing 2 for heat dispersion. Similar fins 74 are provided on the valve casing 7 and also on the valve body 31, while the flattened portion 18 may also have fins 75 as shown.

By means of the above arrangement, the heavier or less refined fuels may be employed in the main fuel tank 41.

What we claim is:—

1. In ignition devices for internal combustion engines, a member having an ignition combustion chamber formed therein and communicating with the combustion chamber of the engine, means whereby an explosive mixture can be drawn into said ignition combustion chamber by the suction from the engine, means for igniting the explosive mixture drawn therein, means whereby a supply of the explosive mixture is retained in reserve, and means whereby such reserve supply is forced into the ignition combustion chamber immediately upon any failure of the engine suction.

2. In ignition devices for internal combustion engines, a member having an ignition combustion chamber formed therein and fitted to the wall of the combustion chamber of the engine, said ignition chamber communicating with the interior thereof, a spark plug fitted to said ignition chamber, a casing having a valve chamber formed therein communicating with said ignition combustion chamber, a non-return valve in said valve chamber adapted to open under suction from the engine, an ignition carburettor connected to said valve chamber and connected to a source of fuel supply, a vessel for containing a reserve supply of explosive mixture connected to said ignition carburettor and to the said valve chamber, said reserve vessel connected to the induction pipe of the engine, and means within said reserve vessel whereby the suction from the engine will draw a reserve supply into said cylinder, and means whereby such reserve supply will be forced into the said ignition combustion chamber upon failure of suction within the engine, and means whereby the reserve supply is prevented from being forced back to the said ignition carburettor.

3. In the apparatus as claimed in claim 2, said reserve vessel consisting of a cylinder, an intake pipe connecting one end of said cylinder to the said valve chamber and also to the said ignition carburettor, a piston in said cylinder, a coil spring between said piston and the other end of said cylinder to normally project said piston to the intake end of said cylinder, a pipe connecting the other end of said cylinder to the induction pipe of the engine so that upon the induction of the engine failing the said piston is forced backwards by means of said spring, and the reserve supply behind said piston is forced into the said valve chamber proportionately to the failure of the induction.

4. In ignition devices for internal combustion engines, a casing fitted into the wall of the engine combustion chamber, an ignition combustion chamber formed within said casing, a valve casing having a valve chamber with a passage communicating with the interior of the ignition combustion chamber, a non-return valve in said valve casing, a member having its interior communicating with the opening controlled by said valve, a distributor pipe communicating with said member, a member having a distributor chamber formed therein to which said distributor pipe leads, a pipe from said distributing chamber to a reserve supply vessel, a pipe from said distributing chamber to an ignition carburettor, a non-return valve controlling the passage between the ignition carburettor and said distributing chamber, and means whereby the reserve supply within said reserve chamber is forced into the distributor pipe upon failure of the induction in the engine.

5. In the apparatus as claimed in claim 4, a socket secured to the said member communicating with the opening controlled by said valve, said socket carrying the distributor pipes and having an internal annular passage, a stud screwed into said member and having an annular passage concentric with the passage on the member so that the explosive mixture may pass through the socket from the distributor pipe of one ignition unit to the distributor pipe of the next unit, said stud having bye-pass openings to connect the annular passage with the interior of the said member, substantially as described.

6. In ignition devices for internal combustion engines, a member having an ignition combustion chamber formed therein, a reserve supply vessel, one end of said reserve supply vessel connected to the induction pipe of the engine, the other end thereof communicating with the said ignition chamber, and means whereby should the induction to the cylinder of the engine fail or diminish the reserve supply in said reserve chamber will be forced into the ignition combustion chamber proportionately to the failure of the induction.

7. In the device as claimed in claim 6, a piston in said reserve chamber, a spring between the end of said chamber that is connected to the induction of the engine and the said piston, whereby the induction in the engine will draw the piston against the spring and draw an explosion mixture into the chamber behind the piston, but upon the induction failing the spring will return the piston and force the reserve supply or a portion thereof to the ignition combustion chamber.

8. In the device as claimed in claim 4, said distributing chamber formed with cross passages to receive a respective distributor pipe to a respective valve casing, the pipe to the reserve cylinder, and a non-return ball valve in a socket threaded into said distributing chamber having a threaded portion to which the pipe to the ignition carburettor is coupled, substantially as described.

9. In the device claimed in claim 2, a starting valve fitted into the engine carburettor below the throttle valve and consisting of a body, a needle jet fitted to said body, a valve fitting a seating therein, a thread on the spindle of said valve screwing into said body, and a passage to which is connected a pipe from the ignition fuel tank, substantially as described.

10. In the device as claimed in claim 4, the ignition combustion chamber conical in form having a lower portion also conical in form but opening outwards into the main combustion chamber, substantially as described.

11. In the device claimed in claim 4, removable cooling fins adapted to fit upon said ignition combustion chamber casing, substantially as described and illustrated.

12. In the device as claimed in claim 4, the valve casing having cooling fins thereon, substantially as described and illustrated.

BEN HOWELL.
CHARLES BJERRE HANSEN.